United States Patent [19]

Frentress

[11] 4,401,024

[45] Aug. 30, 1983

[54] ELECTRONIC PATTERNING WITH REGISTRATION CONTROL

[75] Inventor: Zane Frentress, Stone Mountain, Ga.

[73] Assignee: Milliken Research Corporation, Spartanburg, S.C.

[21] Appl. No.: 366,119

[22] Filed: Apr. 7, 1982

[51] Int. Cl.³ .................. B41F 1/00; G01D 15/06
[52] U.S. Cl. .................. 101/93.01; 346/140 R;
346/157; 101/1; 101/DIG. 13; 101/193;
101/248
[58] Field of Search ............. 346/140 PD, 153.1, 157;
101/1, DIG. 13, 181, 248, 193

[56] References Cited

U.S. PATENT DOCUMENTS

| | | | |
|---|---|---|---|
| 3,218,969 | 11/1965 | Nagel | 101/248 |
| 3,329,087 | 7/1967 | Sandor et al. | 101/248 |
| 3,397,634 | 8/1968 | Betts et al. | 101/248 |
| 3,841,216 | 10/1974 | Huffman | 101/248 |
| 4,007,489 | 2/1977 | Helmberger et al. | 346/157 X |
| 4,205,320 | 5/1980 | Fujii | 346/140 PD X |
| 4,251,827 | 2/1981 | Fujii | 346/153.1 X |

Primary Examiner—Edward M. Coven
Assistant Examiner—John A. Weresh
Attorney, Agent, or Firm—George M. Fisher; H. William Petry

[57] ABSTRACT

Method and apparatus for establishing and maintaining pattern registration control in a printing system which prints an image on a relatively moving substrate. Portions of the overall image are electronically generated and printed in row-by-row (e.g. scanned) fashion at respective print stations positioned along the path of the substrate. Registration control is achieved with the aid of index markings spaced along the length of the substrate.

13 Claims, 9 Drawing Figures

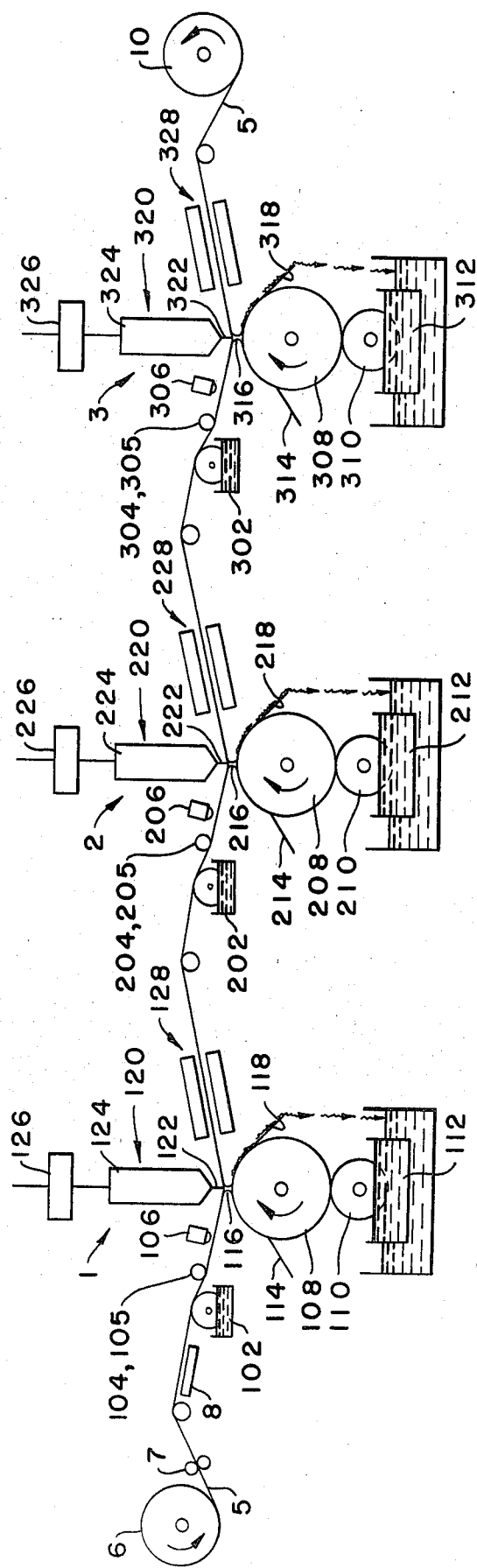
FIG.-1-
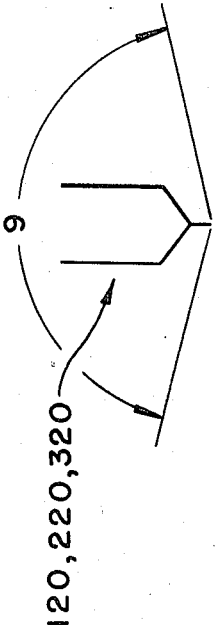
FIG.-2-

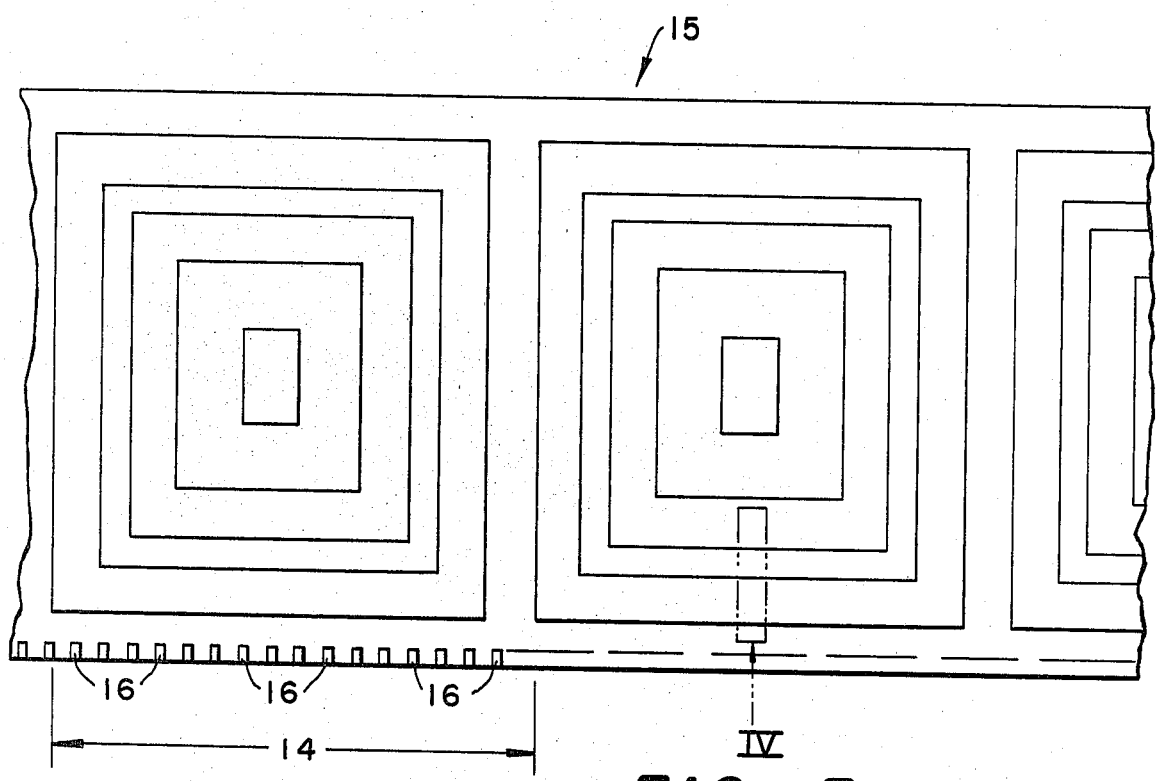
FIG.-3-
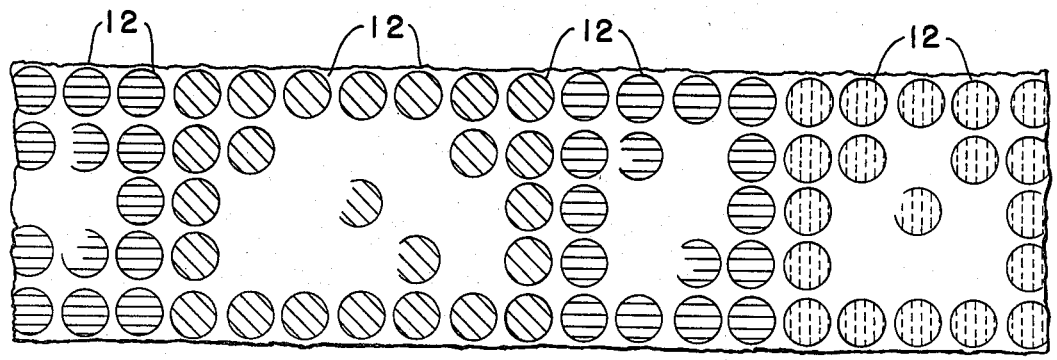
FIG.-4-

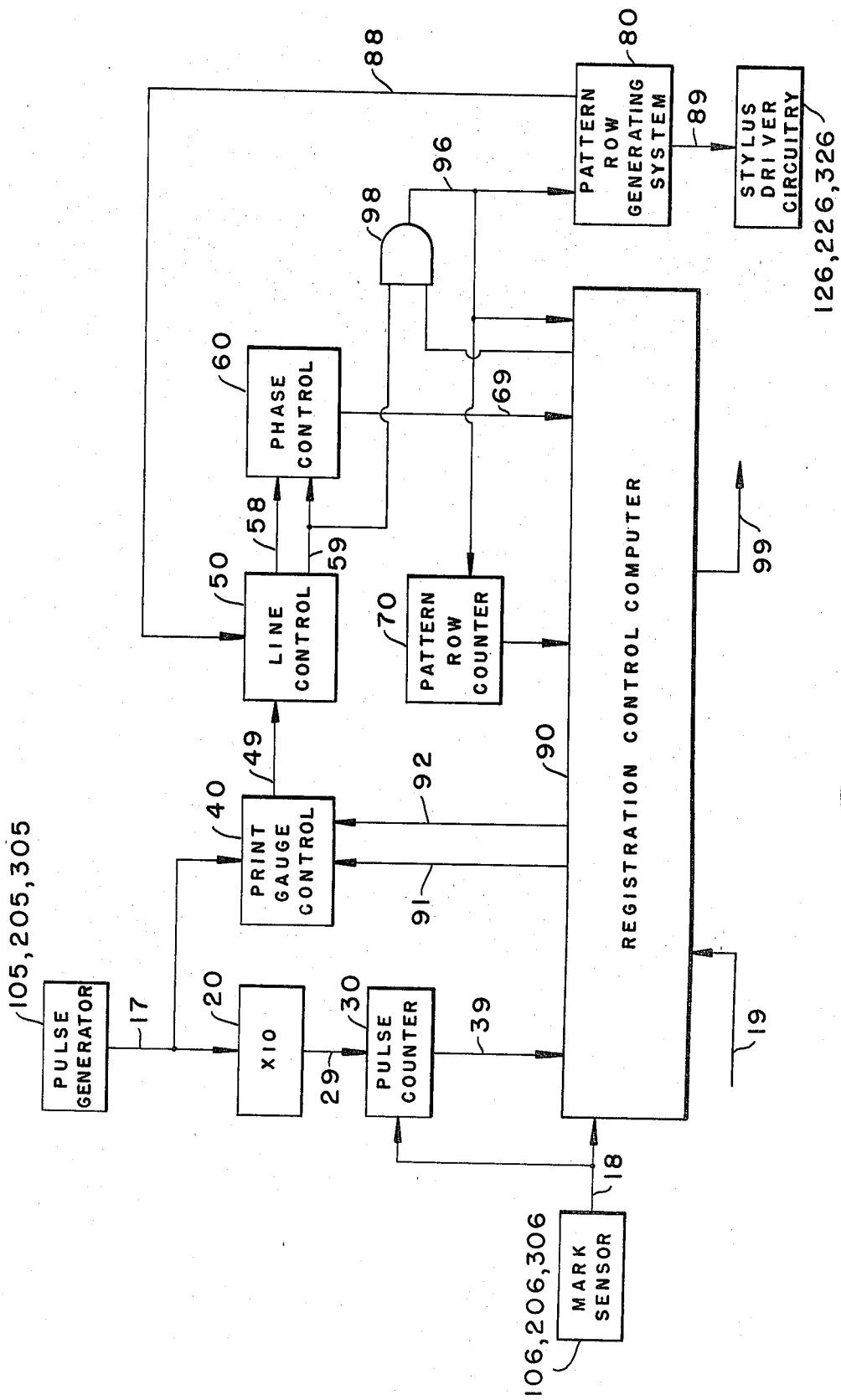

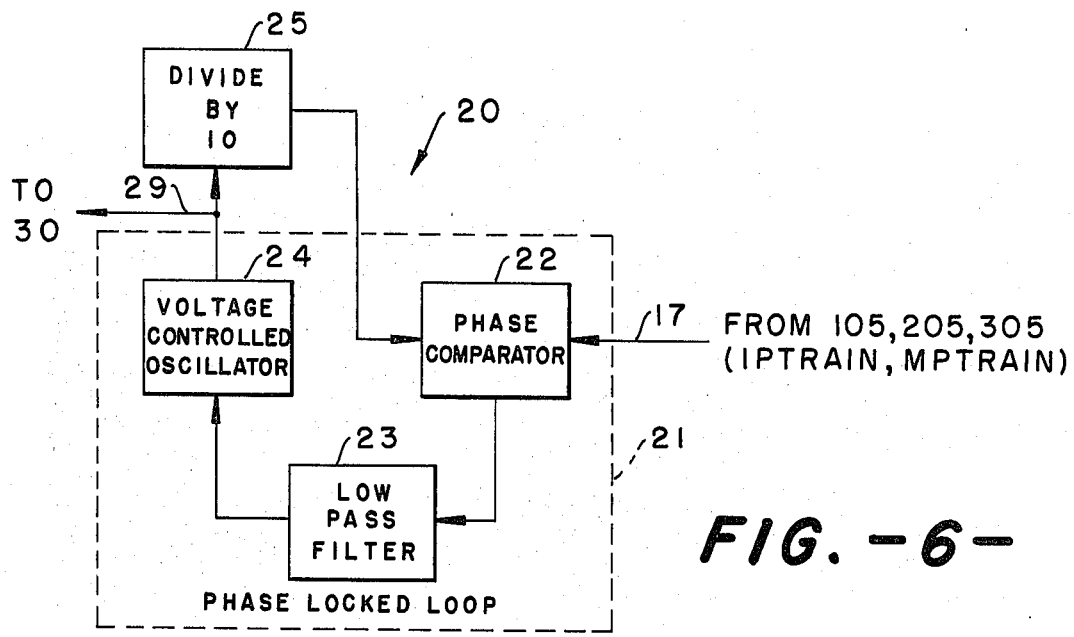
FIG.-6-
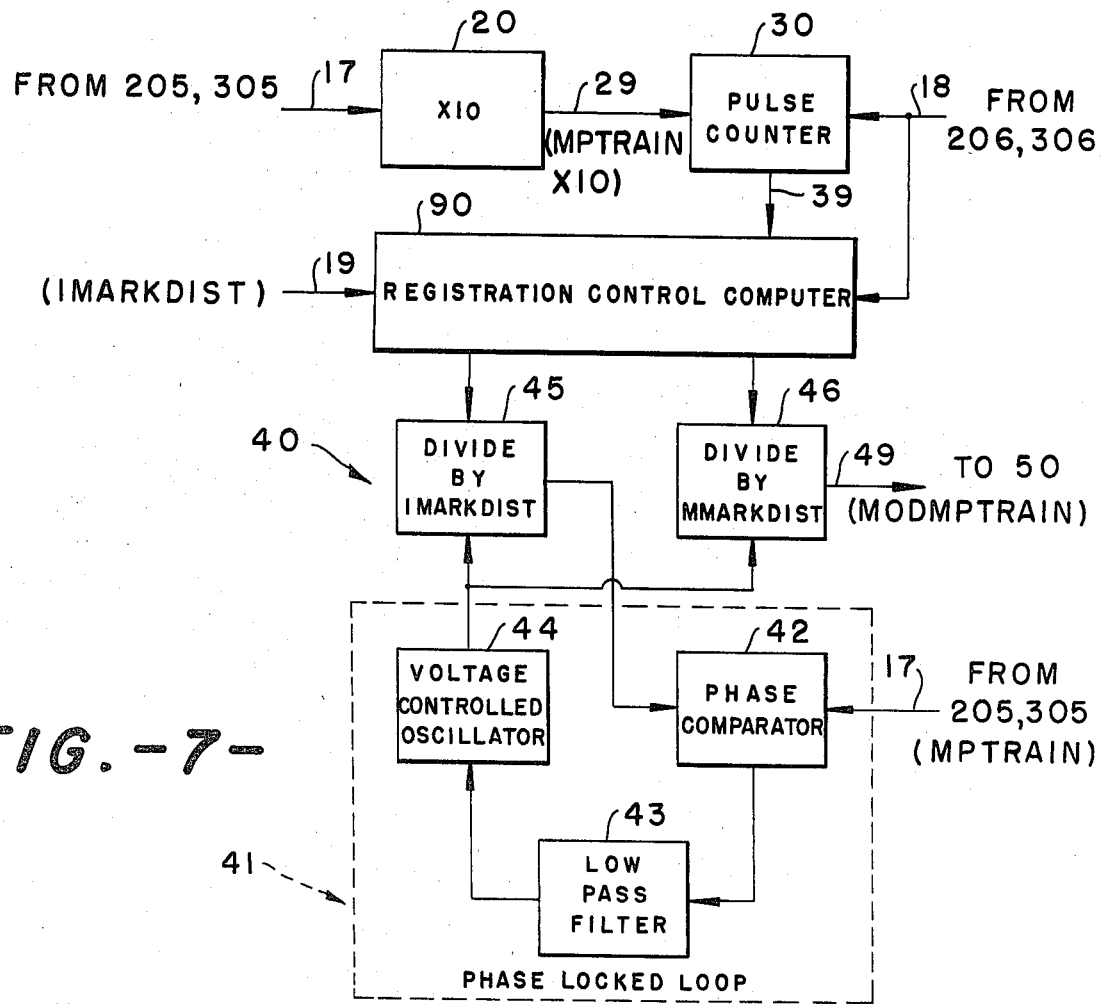
FIG.-7-

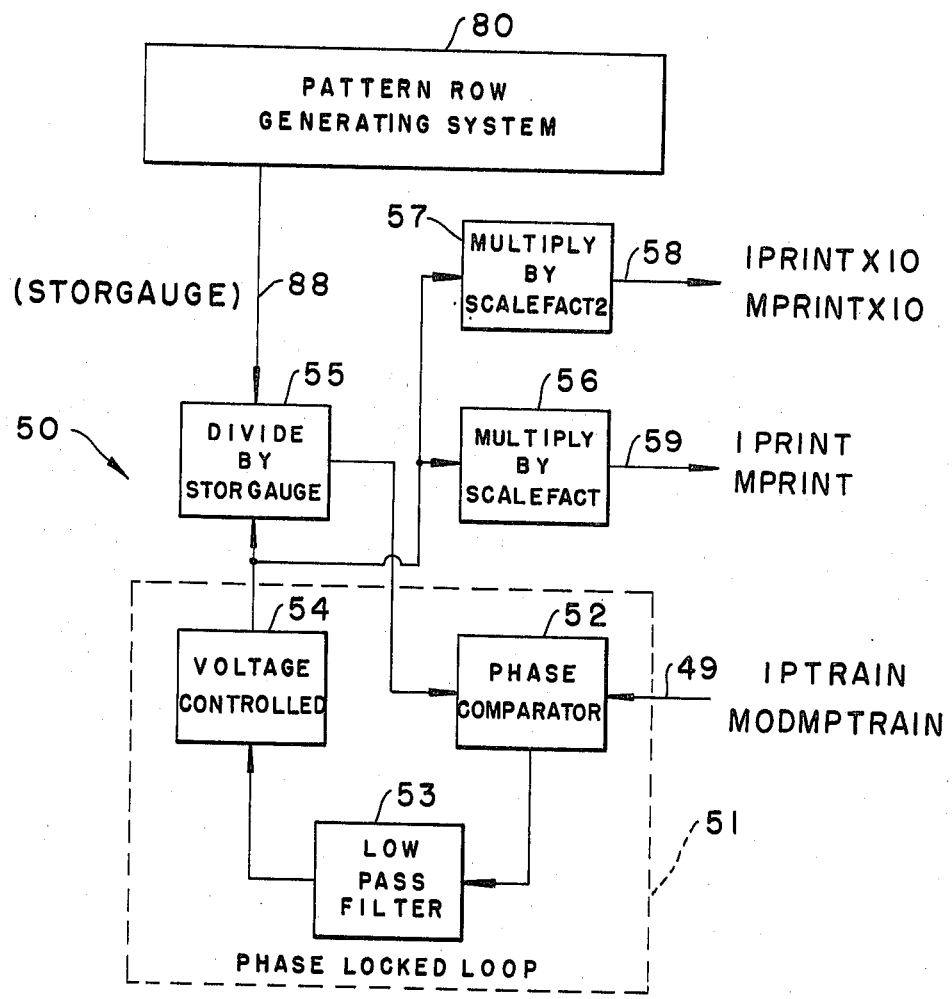
FIG. -8-
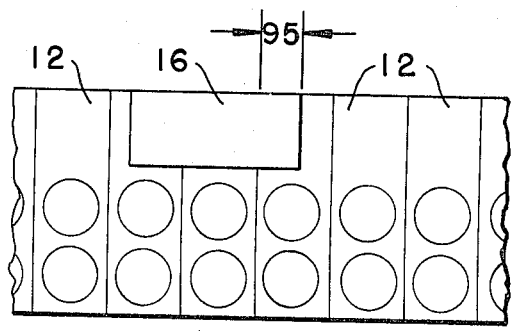
FIG. -9-

ELECTRONIC PATTERNING WITH REGISTRATION CONTROL

This invention relates to a method and apparatus for electronically generated patterning of a substrate which includes a system for maintaining correct pattern registration, wherein the images are electronically generated at several independent patterning stations in row by row increments. Means are disclosed for establishing and adjusting print gauge as the images are being printed, to assure that, where the desired image is an overprint-type composite of several constituent images, each of which is comprised of a set of closely spaced rows of print elements, and where each such aggregate image is printed on a substrate at a respective print station located along the path of relative substrate movement, the constituent pattern images generated at the respective print stations will be in substantial alignment in the direction of relative substrate travel even if the substrate is not dimensionally stable in that direction.

The electronic registration control system disclosed herein may be used to establish and maintain registration among various constituent images of a pattern which are to be overprinted on a relatively moving substrate to form the desired image, for example, where a multi-colored image is desired, and where the constituent image in each color is comprised of an array of closely spaced, individually generated pattern rows which are printed row by row at a single patterning station located along the path of relative substrate travel. The system of this invention can maintain correct registration even if the substrate is not dimensionally stable in the direction of relative substrate travel, and is particularly suitable in applications where extremely small registration tolerances must be observed. The registration tolerance is user-modifiable by way of choices in program parameters. In addition, the registration system of this invention may be used on a multi-station printer or other patterning device even where "on-stream" pattern changes are effected, i.e. a new pattern is initiated at the earlier patterning stations at the same time finishing portions of a previously printed pattern are being printed by later patterning stations. While the description below dealing with the registration control system speaks in terms of printing, this invention is applicable to other patterning methods as well as, e.g., dye injection.

Each print station is associated with a registration control computer which performs a variety of functions. In the print gauge control function, the distance between pairs of previously placed registration marks carried on the substrate is measured with high accuracy at the first print station, and the measured values are stored and compared with the measured values obtained for these same well-defined registration marks as they pass each downstream print station. If the distances are not equal, the image to be printed at that downstream print station is compressed or expanded, by means of adjustments made to the print gauge at that print station by the print gauge control circuitry, so that the adjusted image will accurately fit the measured space between the given pair of registration marks, and thereby register properly with the image printed between those same marks at the first print station. Note it is not necessary that the registration marks be equally or evenly spaced.

A second portion of the registration control circuitry, also a part of the print gauge control function, is used to count and store the running total number of individual rows of print elements which comprise each constituent pattern image as the image is being printed at the first print station. Special note is made of the sequential number assigned to the individual pattern row which precedes but most nearly coincides with the detection of the leading edge of each registration mark at the first print station. Similar counts are made at all downstream print stations, and the print gauge at these subsequent print stations is adjusted by the print gauge control circuitry to assure that the given pattern row always maintains the same sequential relationship with the particular registration mark with which it was associated at the first print station.

Another portion of the registration control circuitry which works through the print gauge control function may be characterized as a phase control function, which measures with precision the distance between the leading edge of a registration mark and the immediately preceding pattern row. While other portions of the print gauge control function relate to sequence control, assuring that a given numbered pattern row will always immediately precede the detection of the leading edge of a given registration mark (or that the pattern row will maintain the same sequential relationship to the given registration mark, whatever that sequential relationship might be), it is left to the phase control function to assure that the distance between the leading edge of the mark and the given print row remains essentially constant. In a sense, the phase control acts as a "fine tuning" means to adjust the print gauge at a given print station to maintain proper registration control within the distance spanned by a fractional part of a single pattern row.

Yet another major portion of the registration control system is the line control circuit, which permits the nominal print gauge actually used in printing the substrate to be essentially independent of the working print gauge used by the registration control system in sensing and calculating the necessary print gauge adjustments to be made in the process of maintaining correct registration.

These features and others may be better understood with reference to the following detailed description and the accompanying drawings, briefly described below.

BRIEF DESCRIPTION OF THE DRAWINGS

FIG. 1 is a schematic drawing of one type of patterning apparatus embodying the pattern registration system described herein;

FIG. 2 is a schematic view of the stylus bar of the patterning apparatus of FIG. 1, showing wrap angle;

FIG. 3 is a plan view of a substrate having a representative multi-colored pattern used on textiles;

FIG. 4 is a schematic, enlarged view of the multi-colored pattern area IV shown in FIG. 3, showing the individual, closely spaced pattern rows of print elements, here depicted as dots;

FIG. 5 is a generalized block diagram showing the major components of the registration control system found at each print station;

FIG. 6 is a generalized block diagram of the X10 circuit shown in FIG. 5 and its associated phase locked loop;

FIG. 7 is a generalized block diagram of the print gauge control circuit shown in FIG. 5;

FIG. 8 is a generalized block diagram of the line control circuit shown in FIG. 5;

FIG. 9 is a schematic detail view of a section of substrate, showing the relative position of a series of pattern rows with respect to the leading edge of a registration mark.

Consistent numbering has been used throughout; therefore, inputs and outputs can be followed easily among the various Figures.

DETAILED DESCRIPTION

In FIG. 1 is shown one example of a multi-station patterning device embodying this invention. The three patterning or printing stations shown generally at 1, 2, and 3 may be considered similar in terms of equipment and function. The specifics of the registration control system which may be used with this patterning device are described separately.

Tracing the passage of a section of substrate, for example, rotogravure paper, to be imprinted on the apparatus depicted in FIG. 1, paper substrate 5 stored on roll 6 passes through printer rolls 7, where a small mark is printed at roughly regular intervals along the edge of the paper. If convenient, these marks, which are used in connection with the registration control system disclosed herein, may be printed off line. It should be understood that while paper is frequently mentioned throughout this discussion, other substrate materials such as plastic films or fabrics may be employed as well.

When a rotogravure-type paper is used on the substrate, the moisture content of the bulk paper is frequently too high for best results. For this reason, an infra-red heater or other pre-drying means, shown at 8 in FIG. 1, is installed in the paper path. As a further conditioning step, it is sometimes desirable to clean the surface of the paper or other substrate through the use of, for example, vacuum means, not shown.

After the paper has been prepared as outlined above, the paper enters print station 1, where a barrier material is applied as a film or coating to one surface of the paper—in the embodiment shown in FIG. 1, the lower surface has been chosen. The method of application may be through the use of an application roll 102, as shown, or may be through the use of spraying means, or any other method resulting in the desired distribution of barrier material on the chosen substrate. For most purposes, a relatively even coating of the barrier material is recommended.

The barrier material comprising the film should be relatively immiscible with respect to the ink or dye to be used. The barrier material must have the property that, in the absence of a displacing force, ink or dye applied to the barrier material-treated surface of the paper will not wet the paper surface. Where an electric field is used as the displacing force, the barrier material should be relatively non-conducting with respect to the ink or dye used, and preferably should be relatively low in viscosity. Furthermore, subsequent drying of the inked paper surface can be aided if the barrier material is somewhat volatile. Examples of liquid barrier materials which have been found to be satisfactory from the standpoint of price and availability include the liquid paraffins n-pentane, n-hexane, Isopar E, G, H, and K (trademarks or Exxon), and Amsco mineral spirits 66/3 manufactured by Union Oil Co.

After the application of the barrier material, the paper passes over idler roll 104 which is associated with a rotary pulse generator 105, not separately shown. The function of roll 104 and associated pulse generator 105 is to detect and signal the passage of a precise, predetermined length of paper 5 or other substrate by generating a voltage pulse for each pre-determined angle of rotation of idler roll 104. Photoelectric sensor 106 is oriented in operative relation with the path of moving paper 5 for the purpose of detecting the passage of the leading edge of each registration mark placed at intervals on the surface of paper 5. It should be understood that the barrier material is applied before the paper passes over idler roll 104 and under sensor 106 merely as a matter of mechanical convenience; other sequences of applicator and detectors are possible.

The next step shown in FIG. 1 includes the actual imaging of the paper surface at print station 1. Paper 5, being substantially uncharged and carrying a thin coating or film of barrier material on its lower surface, is passed over applicator roll 108 which carries on its surface a thin layer of ink or dye supplied by pick-up roll 110 rotating through ink trough 112. Doctoring means 114 is adjustably mounted and may be positioned as shown to distribute the ink on the surface of roll 108 as required. Ink is made available for contacting the paper surface via the formation of a meniscus 116 which is formed across the width of the paper between the layer of ink on the surface of applicator roll 108 and the coating of barrier material on the under surface of paper 5. It is advantageous that roll 108 be designed to discourage barrier material from adhering to the ink layer on the surface of roll 108, or displacing the ink layer from the roll surface. In other words, it is advantageous that the surface of roll 108 be wetted by the ink, and not be wetted by the barrier material comprising the film on the surface of paper 5. Furthermore, even feeding of the ink-containing meniscus 116 as well as efficient doctoring of excess ink from roll 108 is promoted if the surface of roll 108 is smooth. It has been found that a roller surface having a uniform, thin coating of glass or ceramic material works well in this application. Other ink applicators, such as using a doctor blade to meter ink directly on the coated paper, may be used.

Normally, the ink used in the present invention will comprise a liquid and a coloring agent, and will be relatively immiscible with the chosen barrier material. Liquids which have been used include water and mixtures of water with isopropanol, ethylene glycol, and glycol ethers such as ethylene glycol monomethyl ether. Where an electric field is used as the displacement means, the ink should have a relative conductivity that is substantially higher than that of the barrier material. In fact, any dyestuff, pigment, or other coloring matter which can be dissolved or otherwise dispersed in a liquid which is relatively conductive and relative immiscible with respect to the chosen barrier material may be used as a coloring material in conjunction with an electric field type displacement means. While most dyestuff and ink preparations include a surfactant, it is often advantageous to include an additional surfactant in the ink. Suitable surfactants include anionic surfactants such as sodium lauryl sulfate, sodium dodecyl benzene sulfonate, and nonionic surfactants such as the ethylene oxide-propylene oxide adducts of decyl alcohol. Inks which are true solutions may be used as well.

The quantity of ink allowed to coat the surface of applicator roll 108, and therefore the quantity of ink available for maintaining meniscus 116, is controlled by adjustment of the level of ink in trough 112, adjustment of the spacing between rolls 108 and 110 and between doctor blade 114 and roll 108, and adjustment of the speed of rotation of the rolls 108 and 110. Prior to a fresh application of ink from pick-up roll 110, doctor blade 118 is useful in cleaning from applicator roll 108 the admixture of ink and barrier material picked up from the paper surface via meniscus 116. Vacuum means, not shown, may be used to assist doctor blade 118 in cleaning roll 108.

As shown in FIG. 1, an electric field generating means such as stylus bar 120 is situated opposite applicator roll 114, and forms a small gap therewith through which paper 5 must pass. Stylus bar 120 is preferably comprised of a plurality of electrically conductive styli 122, arranged in an end-on orientation in a single row and embedded in a matrix of insulating material 124. In one embodiment, these individual styli 122 are comprised of stainless steel wires approximately 0.10 to 0.15 millimeter in diameter, and are arranged in a single row perpendicular to the direction of substrate travel, with the spacing between adjacent stylus tips chosen to permit printing with the desired resolution. A spacing of about 4 styli per linear millimeter may be used. The styli 122 are situated parallel to and opposite meniscus 116.

To avoid the generation of triboelectric charges on the paper and the consequent degradation in print quality, the tips of styli 122 are exposed, or made to protrude slightly, for example, about 0.05 to 0.4 millimeter and preferably within the range of from about 0.1 to about 0.3 millimeter, from the surface of insulating matrix 124. To establish a uniform geometry between the electric field generating means, in this case the protruding styli tips, and the uncoated side of the paper, it has been found advantageous to apply a force directed generally to drawing and holding the moving paper against the styli 122 and particularly to contouring the paper about the tips of styli 122.

This may be done by adjusting the geometry of the paper relative to the stylus bar or other electric field generating means so that the angle subtended by the incoming and outgoing portions of the paper as the paper passes under the stylus bar, as measured from the unprinted side of the paper and as schematically depicted in FIG. 2, measures less than 180°. This angle 9 is termed the warp angle as it suggests the angle at which the substrate is "wrapped" about the stylus bar or other electric field generating means. Preferred wrap angles range from about 178° to about 174°. It is likely that smaller angles will be preferred for use with some precoated papers and certain alternative electric field generating means.

Each stylus is individually connected to a source of electrical potential, depicted as stylus driver circuitry 126, which may be varied in response to computer generated commands. When no stylus has been energized, i.e., raised to an electrical potential higher than a given threshold voltage, ink in meniscus 116 contacts the film of barrier material but does not wet the surface of paper 5. However, energizing an individual stylus generates an electric field in the vicinity of the stylus tip which extends through the paper, and causes ink from meniscus 116 to displace the barrier film and wet the surface of paper 5 previously covered by the film of barrier material. In this way, an inked region surrounded by a background of barrier film is produced on the coated surface of paper 5.

This displacement or wetting action is extremely localized, and occurs only in that region on the coated surface of the paper directly opposite the stylus tip.

When paper 5 is moving over stylus bar 124, applying a sustained voltage pulse above a requisite threshold value to an individual stylus will cause a line segment to be printed on the paper extending in the direction of paper travel for as long as that stylus remains energized. The printing of a dot is accomplished by energizing a stylus with a single, short voltage pulse of the requisite threshold value. The voltage required to cause a minute quantity of ink to displace the barrier film and wet the paper—the threshold voltage—will vary with the specific conditions, including the speed of the paper, but voltages from about 100 to about 600 volts are usually sufficient. To reduce the voltage levels that must be switched in the driver circuitry, all styli may be baised continuously at a voltage level below the threshold value, using a direct current voltage of positive polarity. In order to cause a given stylus to print, it is then only necessary to supply a voltage pulse of sufficient magnitude to raise the total voltage on the stylus, i.e., bias level voltage plus pulse voltage, to some value in excess of the threshold value.

By adjustment of both pulse height (maximum voltage level) and pulse length (duration of voltage pulse), the actual quantity of ink per unit area within each printed dot or line segment may be varied. It is possible to print solid areas, half-tones, or any other desired pattern, or print line segments which are wider, narrower, or of the same width as the stylus tip.

Following the application of ink to the paper surface and selective displacement of the barrier material by the ink, the printed paper surface is passed to a dryer 128, where the liquid components of the ink and barrier material are evaporated, leaving paper 5 with a printed surface which is dry to the touch. Care must be taken prior to and during this drying stage that the boundaries defining the ink areas are kept intact, and that the inked areas are not allowed to distort or blend into noninked areas. Addition of a second color is accomplished at print station 2. A barrier material (which may be different from the barrier material applied in the first instance) is applied to the dry, previously printed surface of the paper via applicator 202, as before, followed by passage of the paper through the remainder of print station 2, wherein the process steps are similar in operation to those of print station 1. The addition of a third color is accomplished by repeating the above process steps at print station 3. The dried, completely printed paper 5 is stored on take up roll.

In the printer described above, an electric field situated on the opposite side of the paper from the ink applicator is used. However, other displacement means may be used to mechanically or otherwise remove selectively portions of the barrier material in image configuration, and other ink application means and sequences may be used in place of the roller situated opposite the styli as described above.

The following example will further serve to illustrate the operation of the printer, described hereinabove, without reference to the registration control system.

EXAMPLE

Non-dielectric paper sold by Blandin Paper Company under the tradename "Rotoblade" and having a weight of approximately 15.5 kg. per ream is passed through an IR heater manufactured by the Fostoria Corp. of Ohio to lower the moisture content by weight. Residence time in the heater is approximately two seconds. The heater is spaced approximately 20 centimeters from the paper surface. Air temperature near the paper surface is within the range of from about 350° F. to about 420° F. After exiting the heater, the paper is passed near a corona discharge device of conventional design to remove stray charges from the paper surface. The paper is then drawn over a roller which applied to one surface of the paper a thin coating of a hydrocarbon liquid barrier material, which in this example is Amsco mineral spirits 66/3, manufactured by the Union Chemicals Division of Union Oil Co., in a quantity equivalent to approximately 18 grams per square meter of paper surface. The coated paper is then drawn between a stylus bar and an electrically grounded ink applicator roll with the coated side of the paper adjacent to the ink transfer roll. The paper-roll gap spacing is about 0.23 millimeter. The surface of the ink applicator roll is coated to a thickness of approximately 0.3 millimeter with a ceramic compound comprised of approximately 60% aluminum oxide and 40% titanium carbide. The speed of the paper is approximately 15 centimeters per second and the amount of ink fed to the meniscus by the ink applicator roll is approximately 20 millileters per minute. Paper tension is approximately 0.2 kg. per linear centimeter of paper width. The stylus bar uses a single row of stainless steel styli of about 0.125 millimeter in diameter and having a spacing of approximately 4 styli per millimeter, each surrounded by a non-conductive epoxy resin, with the tip of each stylus approximately 0.2 millimeter from the surface of the resin. Each stylus is biased to a potential of 100 volts (positive polarity) relative to ground, with no image resulting, and is then energized to about 400 volts relative to ground in accordance with pattern information supplied by a digital computer. The paper is "wrapped" about the styli at a wrap angle of approximately 176°. The ink contained approximately 12% of a red dye sold by Ciba Geigy as Teraprint Red 3G, about 69.5% distilled water, about 18% binder principally comprising a copolymer of methyl methacrylate and ethyl acrylate (Rohm and Haas Rhoplex HA16), about 0.5% of a nonionic wetting agent (Leveler 2406 sold by Milliken Chemical Co.), and a small amount of a defoaming agent (Nopco 267F). The paper is passed through a dryer. A sharp, well defined image is obtained in a single color. The paper is then passed to print stations 2 and 3 in sequence, where the same barrier material was applied, as above, and remaining process steps are repeated with inks of various colors.

It should be understood that this invention is adaptable for use with any multi-station printer, dyeing machine, or the like in which the constituent image associated with each individual print station can be conceived as comprising an array of closely spaced rows of individually generated print lines or pattern lines, and wherein the print gauge or its equivalent may be adjusted during the printing process at the second and each subsequent print station.

A pattern of a type commonly used in the textile industry is schematically depicted in FIG. 3. The closely spaced, individual rows of print elements which extend across the substrate perpendicular to the direction of substrate travel and by which the pattern is printed, one pattern row at a time in row by row fashion, are depicted in FIG. 4 at 12. The print elements in this example roughly correspond in size to individual cells in an etched rotogravure pattern cylinder. The pattern repeat unit (PRU), which defines the non-repetitive portion of the overall pattern, is shown in FIG. 3 at 14. The pattern, in the sense that the term shall be used hereinafter, is shown generally at 15 in FIG. 3. Registration marks of a type which can be used in connection with the invention disclosed herein are depicted at 16.

In FIG. 1, printing substrate 5 is schematically depicted being printed upon by an electrographic printing device wherein three individual print stations are shown spaced along the path of substrate travel at 1, 2, and 3. Each of these print stations may be used, for example, to print (or overprint) a constituent image in a different color to produce an image printed in three primary colors. It will be clear from the description which follows that the invention is also suitable for printing or dyeing devices using two, or four or more, print stations or multiple, or separate applications of ink or dye from a single print station. It should also be mentioned that, while the description herein speaks in terms of multi-colored images, the invention is not limited to such applications. It is entirely foreseeable, for example, that this invention can be practiced wherein several constituent images printed with the same color ink or dye are required, as when a particularly heavy application of a single color of ink is required and two lighter applications of ink, with perhaps a drying step between applications, is found to yield a desirable result.

Each print station 1, 2, 3 has associated with it a circular idler roll 104, 204, 304 which is coupled to a rotary pulse generator 105, 205, 305 of known circumference. Each pulse generator will produce a single pulse for a given predetermined fixed angle of rotation of its respective idler roll. When brought into operative relationship with substrate 5, pulse generators 105, 205, 305 will produce pulses corresponding to the passage of a known, fixed length of substrate 5 through their respective print stations. Generators 105, 205, 305 produce a pulse train which corresponds to the "working" print gauge used by the registration control system, i.e., if the generators 105, 205, 305 produce one pulse for every 0.25 millimeter of substrate travel, for a total of 40 pulses per centimeter, the working print gauge is, by definition, 40 pattern rows per centimeter. One pulse will be generated each time a length of substrate equivalent to one pattern row passes over an idler roll. It should be understood that the choice of "working" gauge is somewhat arbitrary and is usually chosen at the time the registration control system is initially installed; any value which would result in a generally satisfactory level of image resolution may be used, without restricting the average gauge in which the actual printing will be done. This latter gauge will be termed the nominal print gauge. Because the pulse generator output marks the passage of a fixed length of substrate, independent of substrate speed, the pulse rate per unit time may be used to measure substrate speed.

Also associated with each print station 1, 2, 3 is a registration mark sensor 106, 206, 306 which is used to detect the leading edge of well-defined registration marks, shown at 16 in FIG. 3, which are printed at intervals along the length of the substrate. In practice, it is usually most convenient to print such registration marks along one edge of the substrate, and preferably on the surface opposite the surface on which the pattern will be printed, but other locations on the substrate may be used. This printing operation occurs ahead of the first print station, and may be done off line. It has been found to be effective to print registration marks at nominal intervals of 2.5 centimeters, but other spacings are possible. As will be seen in the discussion which follows, the precise relative spacing, size, and shape or configuration of these registration marks is not critical. For example, non-uniform mark spacing may be employed. This fact represents a significant advantage of the instant invention. Sensors 106, 206, 306 are of the photoelectric type to avoid the use of special inks when printing the marks 16, but other types of detectors, such as magnetic or capacitive, may be employed if desired.

As depicted in FIG. 1, the registration mark sensors 106, 206, 306 should be physically positioned ahead of, and in close proximity to, their respective print stations, at a distance equal to or slightly greater than the nominal distance between adjacent registration marks. The pulse generator idler rolls 104, 204, 304 should also be placed in close physical proximity to the print stations, but may be ahead or behind respective sensors 106, 206, 306. However, the relative position of idler rolls 104, 204, 304, sensors 106, 206, 306, and the actual print generation means within each print station, for example, the styli indicated at 122, 222, 322, should be fixed and uniform for all print stations.

Finally, associated with each print station is a registration control computer, not shown in FIG. 1, comprising counting registers as well as arithmetic and logical function modules. Further details of the computer functions and architecture are shown in FIG. 5 and are discussed below.

Initiation of the printing of the first color of the chosen pattern is made to coincide with the sensing of the leading edge of an arbitrarily chosen "start" registration mark by mark sensor 106 at print station 1. Printing of this pattern in a second and third color is initiated with the detection of the leading edge of this same arbitrarily chosen "start" registration mark by mark sensors 206 and 306 at the second and third print stations, respectively. In practice, it is helpful to inhibit the printing function until several registration marks have passed through all print stations, to allow the registration control system to establish control. AND logic gate 98 in FIG. 5 provides a switch wherein the registration control functions may be enabled while the printing function is inhibited.

The following discussion may be best understood with reference to the block diagram of FIGS. 5 through 9 as well as FIG. 1. FIGS. 5 through 8 are intended to represent basic operations performed at each and every print station. While some feature numbers (data links) in some figures may relate to print station 1, and the following discussion will concentrate on operations at print station 1, it should be understood that all print stations downstream of print station 1, which shall hereinafter be referred to generally as print station M (where M may be 2, 3, etc.), will have all facilities depicted in FIGS. 5 through 8, except print station 1 will not have a link 19 equivalent (input from preceding print station) and print station 3 will not have a link 99 equivalent (output to downstream print stations), as shown in FIG. 5. The notation used to describe the various pulse trains, counter contents, registration mark intervals, etc. will also use the convention of using the prefix "1" to indicate association with print station 1, and the prefix "M" to indicate association with any downstream print station following print station 1.

As soon as the leading edge of the arbitrarily chosen "start" registration mark is detected by sensor 106 at print station 1, two separate count registers at print station 1 are cleared or initialized to zero. One such register is a pattern row counter 70 in which a count of each row of print elements, or its equivalent (i.e., a single "gauge" row) is accumulated. Actually, the counter is incremented each time a print command decision for an "equivalent" pattern row, i.e., a pattern row or the space equivalent to a pattern row, is generated for that print station. For example, assuming the pattern being printed calls for a blank space equivalent in size to six rows of pattern elements, the pattern row counter is incremented six times as that section of the substrate intended to be unprinted passes the print station, even though the print station prints nothing on the substrate. The term "pattern row" is used herein to refer to either an actual row of print elements, or an "equivalent" pattern row. This counter ignores pattern repeat units (PRU's) and continues to accumulate the total number of pattern rows of a given pattern or print run passing the print station until the capacity of the counter is exceeded, at which time the counter automatically clears to zero and begins to count again. The contents of this counter at print station 1 will be referred to hereinafter as 1ROWCOUNT; contents of a similar counter at each downstream print station M (M=2, 3, etc.) will be MROWCOUNT. It is suggested that a relatively high capacity count register be used, for example, one which can accumulate several PRU's of a given pattern. If, for example, one is using a pattern having a PRU length of three centimeters and a nominal print gauge (i.e., pattern row density) of 500 rows per centimeter, the register should have a capacity in excess of, say, five thousand. In one embodiment of the invention, a counter capacity of 65,535 is used.

A second counter 30 is also initialized to zero, and accumulation of the number of pulses generated by pulse generator 105 is begun. As above, similar counters are located at each downstream print station. The pulse train generated by pulse generator 105 at print station 1, which pulses correlate with the passage of a fixed length of substrate equivalent to a single pattern row in the "working" print gauge, and which shall be termed 1PTRAIN, are first passed through a closed loop frequency feedback system 20, labeled in FIG. 5 as X10, which effectively multiplies the the pulse rate of pulses 1PTRAIN generated by pulse generator 105 by a factor of 10 and thereby generates pulse train 10PTRAINX10. Looking briefly at FIG. 6, which represents details of block 20 in FIG. 5, the three blocks inside the dashed block 21 comprise a phase locked loop, the purpose of which is to generate an output pulse train having a frequency exactly 10 times greater than the input pulse train. The output of phase comparator 22, after passing through low pass filter 23, forces the output frequency of the voltage controlled oscillator 24 to a valve that is, after being divided by 10 in divider 25, the same frequency as the input pulse train from the pulse generator of the particular print station. The output on link 29, termed 1PTRAINX10 for print station 1 and MPTRAINX10 for a downstream print station M, is therefore a train of pulses whose frequency is always ten times the frequency of the input pulse train 1PTRAIN or MPTRAIN. The multiplier value of 10 is somewhat arbitrary; a different multiplier of pulse generation frequency may be chosen if increased or decreased resolution is desired.

Because the pulses in pulse train 1PTRAINX10 also correlate with the passage of a fixed, but now shorter, length of substrate past idler roll 104, for example, 0.025 millimeter, accumulating this pulse count will yield a quantity which corresponds to measured distance from the leading edge of the registration mark. The pulses of pulse train 1PTRAINX10 are accumulated in pulse counter 30 until the leading edge of the next following registration mark is detected by sensor 106 at print station 1. When the leading edge of this subsequent mark is detected, pulse counter 30 now contains the number of pulses generated by pulse generator 105, times 10, which is the equivalent of the distance between these two adjacent registration marks as the substrate passed idler roll 104 at print station 1, measured in units of 0.025 millimeter. For purposes of discussion below, this accumulated pulse total can be termed 1MARKDIST($\frac{1}{2}$) indicating the linear distance (MARKDIST) between, in this case, the first and second registration marks (MARKDIST($\frac{1}{2}$)), at print station 1 (1MARKDIST($\frac{1}{2}$)). The value 1MARKDIST($\frac{1}{2}$) is transferred to the registration control computer 90 at print station 1 which in turn transfers the value to the storage registers in the registration control computers located at all other print stations, via link 99. After the accumulated value 1MARKDIST($\frac{1}{2}$) is transferred to the registration control computer at print station 1, pulse counter 30 is cleared and the accumulation of pulses, now corresponding to the distance between the next set of adjacent pairs of registration marks, is again begun. In this way, measured distances at print station 1 between the second and third registration marks detected on the substrate after a pattern has been initiated, 1MARKDIST($\frac{3}{4}$), as well as values for 1MARKDIST($\frac{3}{4}$), 1MARKDIST(4/5), etc. are generated, transmitted, and stored. In the discussion hereinafter, the generalized term 1MARKDIST and MMARKDIST will be used without the parenthetical indices; it is to be understood that the values addressed correspond to the same adjacent pair of registration marks.

For each 1MARKDIST value generated at print station 1, corresponding values of MMARKDIST (i.e. corresponding distances between the same registration marks) are generated at each downstream print station when the same pair of adjacent registration marks reach the mark sensor associated with each such station. These values are generated by counting the pulses in respective pulse trains MPTRAINX10 which in turn are derived from the output of respective pulse counters 205, 305 at each print station. However, unlike the situation at print station 1, these downstream-generated values are stored only in the registration control computer at the print station where the measurement is made, and are not transmitted to any other print station. For a given pair of adjacent registration marks, comparison of the value MMARKDIST generated by the local pulse counter at downstream print station M with the corresponding 1MARKDIST value measured and transmitted from print station 1 will determine the existence and extent of any dimensional change in the substrate along the axis of substrate travel which has occurred between print station 1 and downstream print station M. In other words, the linear distance between every adjacent pair of registration marks is first measured at print station 1, and the results of that measurement are sent to all other print stations. When any given pair of adjacent registration marks reaches the second and each subsequent print station, a measurement between this same pair of marks is again made and compared with the earlier measurement for this pair of marks made at print station 1. If a difference is noted, it means that the distance between the adjacent marks has changed since the substrate passed through print station 1, and the substrate has therefore stretched or shrunk.

Having determined that the substrate has stretched or shrunk since leaving print station 1, and that some constituent image expansion or compression will be necessary in order to achieve proper registration for constituent images printed at the subsequent downstream print stations, the discussion below outlines that part of the invention dealing with modification of the print gauge, i.e., relative spacing between adjacent pattern rows, to achieve the desired expansion or compression of the printed image.

The block in FIG. 5 labeled Print Gauge Control and identified as 40 is shown in more detail in FIG. 7. At each print station following print station 1, the Print Gauge Control circuitry represented by FIG. 7 adjusts the working print gauge (1) to compensate for stretching or shrinking of the substrate, (2) to correct for pattern row number disagreements between print station 1 and each of the other print stations, and (3) to correct for shifts in the position of a given pattern row, relative to the leading edge of each registration mark, amounting to a fractional part of the distance spanned by a single pattern row. It should be emphasized that these three adjustments are made at all stations other than print station 1. Print station 1 prints at a fixed, pre-determined gauge equal to the working gauge or some constant, not necessarily integral, multiple of the working gauge (about which more will be said), with no adjustment for stretching or shrinking, pattern row number disagreement, or pattern row shifting. Therefore, the comments in this section relate to circuitry needed only at print station M (M=2, 3). The print gauge control circuitry is physically installed at print station 1 as a measure to promote hardware interchangeability, but is fed fixed, "dummy" values which render it functionally transparent.

The adjustment of the working print gauge to compensate for stretching or shrinking is accomplished by modifying the frequency of pulse train MPTRAIN generated by the local pulse generator 205 or 305. As mentioned earlier, the pulse train represented by MPTRAIN corresponds to the working print gauge (i.e., number of pattern rows per unit distance of substrate).

Referring to FIG. 7, the quantity 1MARKDIST is measured at print station 1 and transmitted to the registration control computer at print station M and held there until the pair of marks from which it was measured reaches the mark sensor at print station M, at which time the measurement is repeated—the result here termed MMARKDIST—and the value 1MARKDIST is is loaded into a "divide by 1MARKDIST" circuit 45. Analogous to the 10X circuit of FIG. 6, the output of phase locked loop 41 is intended to generate an output pulse train having a frequency equal to the product of the input pulse train MPTRAIN from pulse generator 205 or 305 and the value 1MARKDIST from print station 1. The resulting product, pulse train 1MARKDIST.MPTRAIN, is routed to a "divide by MMARKDIST" circuit 46 to product a pulse train equivalent to (1MARKDIST/MMARKDIST).MPTRAIN, and termed MODMPTRAIN. If the substrate has not stretched or shrunk between print station 1 and print station M, then the quotient (1MARKDIST/MMARKDIST) will be equal to unity and the frequency of pulse train (1MARKDIST/MMARKDIST).MPTRAIN (i.e., the frequency of pulse train MODMPTRAIN) will equal that of MPTRAIN. If MMARKDIST is greater than 1MARKDIST, the substrate has stretched and the quotient (1MARKDIST/MMARKDIST) will be less than 1. If MMARKDIST is smaller than 1MARKDIST, the substrate has shrunk and the quotient (1MARKDIST/MMARKDIST) will be greater than 1. In either case, the quotient will reflect the degree of stretching or shrinking which the substrate has undergone between those reference marks used as the basis for MARKDIST and MMARKDIST. The quotient is then used as a multiplicative factor to increase or decrease the frequency of MPTRAIN. At print station 1, because there is no value corresponding to MMARKDIST, the registration control computer at print station 1 uses a "dummy" value equal to 1MARKDIST, forcing the above quotient to unity.

In summary, the circuitry modifies the input pulse train MPTRAIN from the rotary pulse generator of print station M, which corresponds to the working print gauge (i.e. equal number of pulses and pattern rown per unit distance of substrate) in a way to produce an output equal to (1MARKDIST/MMARKDIST).MPTRAIN, where 1MARKDIST is the distance between two given adjacent registration marks at print station 1, and MMARKDIST represents the distance between the same two adjacent registration marks as measured at print station M. This output in effect modifies the frequency of MPTRAIN by a factor proportional to the amount of stretching or shrinking which the substrate has undergone since leaving print station 1. Because of the correspondence between MPTRAIN and the working print gauge, this output, which shall be termed MODMPTRAIN, is now a pulse train which similarly corresponds to a working print gauge for use at this print station and which is modified to compensate for the exact amount of substrate stretching or shrinking. This ouput MODMPTRAIN of the print gauge control circuit is then introduced into the line control circuit, shown in FIG. 8, and will be discussed later.

The second major function performed by the print gauge control circuit is adjustment of the print gauge to correct for pattern row number shifts occurring between print station 1 and the downstream print stations. As the leading edge of each registration mark N is detected at print station 1, the value of 1ROWCOUNT is used to identify the number of the pattern print row occurring immediately before the detection of that mark; this pattern row number is stored and compared with the number of the corresponding pattern row which passes downstream print station M immediately prior to the detection of the leading edge of that same mark N at print station M. This value is obtained by use of the value of MROWCOUNT at the instant the mark N is detected at print station M. Disagreement between these two pattern row numbers indicates that the pattern to be printed at downstream print station M will not be in proper registration unless an adjustment is made. The adjustment lies in changing the print gauge in which portions of the pattern immediately following will be printed at downstream print station M by an amount sufficient to compensate for the disagreement and bring the pattern row numbers into eventual agreement. This is accomplished by modifying the value of the quantity MMARKDIST at print station M before it is used to calculate MODMPTRAIN at that print station. It will be remembered that MMARKDIST is the contents of a pulse counter and represents a high resolution distance measurement between adjacent registration marks at print station M. For example, if the pattern row number noted at print station M differs by one from the pattern row number noted at print station 1, the value of MMARKDIST is increased or decreased by one, depending on the direction of the row number error noted. This revised value of MMARKDIST is then used to generate MODMPTRAIN at this print station. Assume, for example, the row number is one greater than the corresponding number noted at print station 1, indicating the image has shrunk slightly. To compensate, MMARKDIST is increased by one, thereby decreasing the value of MODMPTRAIN and the working print gauge it represents. By numerically decreasing the working print gauge the nominal print gauge may be modified to cause the same number of pattern rows to be printed over a longer length of substrate, thereby expanding the image as printed and moving the row numbers in the direction of agreement.

If the row number discrepancy is two or more, MMARKDIST is increased or decreased by a value equal to five times the total row number discrepancy (e.g., a pattern row number discrepancy of 3 results in MMARKDIST being varied by 15). This factor of five is somewhat arbitrary and may be varied. However, the value five has been found to result in fairly rapid adjustment of the print gauge when the registration error is substantial, yet does not cause the registration control system to overshoot or tend to cause registration adjustments in the printed pattern which are visually distracting.

In this way, the effect of any pattern row number disagreements may be accounted for in the process of generating a revised value for the print gauge to be used at print station M in printing the portion of the pattern lying between marks N and N+1 or beyond. In actual practice, this control function is primarily used in establishing registration at the beginning of a pattern run. Once adjustments based on variations in the (1MARKDIST/MMARKDIST) ratio are made, indicating station-to-station variations in the linear distance between respective adjacent registration marks, it has been found that the monitoring of pattern row numbers merely serves as a registration check.

Programming of the basic or desired nominal print gauge at every print station is the function of the line control circuitry, depicted at 50 in FIG. 5 and shown in more detail in FIG. 8. The intended nominal print gauge of the pattern as selected and generated in the pattern row generating system 80, a value which shall be termed STORGAUGE, is frequently not the same as the working print gauge used as a basis for calculation by the registration control system, determined by the pulse rate calibration value of pulse generators 105, 205, 305. A scaling factor, SCALEFACT is used to allow any desired value of STORGAUGE corresponding to the desired nominal print gauge to be used in printing the patterns on the substrate, without having no change the working print gauge. This print gauge scaling factor SCALEFACT is numerically equal to the reciprocal of the value used in defining the working print gauge, as produced by pulse generators 105, 205, 305 at their respective print stations, assuming a common unit of substrate length is used in specifying both print gauge (e.g., pattern rows per centimeter of substrate) and pulse frequency (e.g., pulses per centimeter of substrate). Therefore, if pulse generators 105, 205, 305 are chosen to deliver 40 pulses per centimeter of substrate travel, (i.e., a working print gauge of 40 pattern rows per centimeter), and if the value of STORGAUGE is expressed in units of pattern rows per centimeter, then the value of SCALEFACT would be (1/40) or 0.025.

As a further example, assume the desired nominal print gauge of a given pattern as generated in system 80 (see FIG. 8), i.e., STORGAUGE, is 60 pattern rows per centimeter, and the working print gauge is 40 pattern rows per centimeter. In this example, then, generators 105, 205, 305 would produce one pulse for every (1/40) centimeter of substrate travel. The value of SCALEFACT would then be (1/40) or 0.025. Following the flow shown in FIG. 8, assume that the frequency of the pulse train output from the print gauge control circuit at print station M, MODMPTRAIN, represents a modified working print gauge of forty-two pattern rows per centimeter, indicating the substrate has shrunk slightly since leaving print station 1. This pulse train is input to the phase locked loop 51, and a pulse train having a frequency exactly higher, by a factor equal to the scalar STORGAUGE, the stored nominal print gauge, is produced. This pulse train, MODMPTRAIN.STORGAUGE, which in this example would have a pulse frequency of 2520 pulses/cm., is then multiplied by SCALEFACT, to yield an output pulse train with a frequency of 63 pulses/cm., corresponding to the desired nominal print gauge to be used in printing the substrate, as modified by the registration control system to account for substrate shrinking. This digital output shall be termed MPRINT, and can be interpreted as the product of (1) the pulse train from the local pulse generator representing the working print gauge used by the control system, modified to reflect extent to which this section of substrate has stretched or shrunk, (2) the desired nominal print gauge, and (3) a scaling factor. Therefore, MPRINT is a print command to which the generation of successive pattern rows on the substrate may be keyed at print station M—for each pulse, a pattern row of the desired pattern, as stored in the pattern row generation system 80, is printed at print station M.

A second output of this circuit is equivalent to the input to the divider circuit multiplied by a different scale factor SCALEFACT2, having the value ten times greater than SCALEFACT. This output value, which shall be termed MPRINTX10, and which is merely a pulse train having a frequency exactly 10 times the frequency of MPRINT, is used in the phase control circuitry, described below. The values 1PRINT and 1PRINTX10 shown in FIG. 8 are the values generated at print station 1, from input 1PTRAIN at print station 1. Because print station 1 prints at a fixed gauge without regard for registration errors, there is no MOD1PTRAIN corresponding to the MODMPTRAIN calculated at other print stations. At print station 1, the line control circuit merely converts the unadjusted working print gauge, represented by 1PTRAIN, into the desired nominal print gauge, via SCALEFACT.

The phase control function is depicted at 60 in FIG. 5. The function of this circuit is similar to the pattern row shift function of the print gauge control circuit, but the circuit is designed to make adjustments for subtle shifting of a pattern row which would not be sufficient to introduce a disagreement in pattern row numbers. Because the pattern row shift function of the print gauge control circuit will sense registration discrepancies with resolution only to the closest pattern row, the phase control described herein is used to correct for registration errors involving distances less than that spanned by one pattern row. This circuit assumes, therefore, that no shift great enough to affect pattern row numbers has occurred. As part of the phase control circuitry, DOWNCOUNT counters 1DOWNCOUNT at print station 1 and corresponding counters MDOWNCOUNT at each print station M are preset to a value of 10 by pulses 1PRINT and MPRINT from each respective station's line control circuit 50. Also from each respective line control circuit 50, the pulses 1PRINTX10 and MPRINTX10 cause respective counter 1DOWNCOUNT and MDOWNCOUNT to decrement one count. Each time registration mark sensors 106, 206, 306 indicate the passage of the leading edge of a registration mark N, the registration control computer at that respective print station inputs the contents of the DOWNCOUNT counter at that print station. The contents of this counter, ROWSHIFT, can be equated to the distance from the leading edge of registration mark N to the leading edge of the pattern row which immediately precedes that registration mark N, as depicted at 95 in FIG. 9, measured in units of 0.1 pattern rows at the working print gauge. The value at print station 1, 1ROWSHIFT, is transmitted to the respective registration control computers at all downstream print stations. When the same registration mark N is sensed at print station M (M=2, 3), the contents MROWSHIFT of a corresponding MDOWNCOUNT counter are input to the registration control computer at print station M, whereupon the values 1ROWSHIFT and MROWSHIFT are compared. Unequal values of 1ROWSHIFT and MROWSHIFT indicate the relative position of the given pattern row has shifted slightly with respect to its distance from the leading edge of its associated registration mark N. If these two valves differ by only 1, indicating the pattern rows are only 0.1 pattern rows (working print gauge) off perfect registration, no action is taken—the registration is assumed to be within tolerance. If, however, the difference between the two valves is 2 or more, the registration control computer adjusts the value of MMARKDIST which is used in the print gauge control circuitry at print station M by one unit, increasing or decreasing its value as appropriate to reduce the difference between MROWSHIFT and 1ROWSHIFT. Not that even if the differences between 1ROWSHIFT and MROWSHIFT is greater than two, up to the maximum possible of 9, the value of MMARKDIST is still adjusted by only one unit, thereby effectively adjusting the working print gauge at the rate of one-tenth pattern row per registration mark spacing. Because the registration error is always assumed to be less than one print row by this circuit, more rapid adjustment of MMARKDIST, which might result in an abrupt shift conspicuous to the eye, is considered unnecessary.

Modifications may be made to the overall configuration of the registration control system described herein, such as the physical consolidation of computer-type functions for the individual print stations and decision logic constants, without departing from the scope of the invention as defined in the appended claims.

I claim:

1. A method for maintaining correct registration in a printing system having a plurality of print application stations for printing a pattern on a relatively moving substrate wherein the desired image is a composite made from the superposition of a plurality of constituent images, each constituent image being formed as a plurality of closely spaced pattern rows and wherein each constituent image is printed in row-by-row fashion at a respective print application station spaced along the path of the substrate, said method comprising:

(a) supplying a quantity of substrate to be printed having a plurality of reference marks fixed at intervals along the substrate in the direction of substrate movement;

(b) applying, at an initial print application station and at a pre-determined print gauge, a number of consecutive pattern rows within a substrate length defined by a first and a second of said plurality of reference marks, said second mark being preceded by said first mark;

(c) measuring said substrate length at said initial print application station;

(d) measuring said substrate length at a subsequent print application station following said initial station;

(e) comparing the results of said substrate measurements at said initial and said subsequent print stations, thereby determining any change in substrate length, as measured at said initial and subsequent print stations, between said first and said second reference marks along the direction of substrate relative movement;

(f) adjusting said pre-determined print gauge for use at said subsequent print application station to permit the number of pattern rows applied between said first and said second marks at said subsequent print application station to equal the number of pattern rows applied between said first and said second reference marks at said initial print application station.

2. The method for registration control as recited in claim 1, said method further comprising:

(a) assigning, at said initial print application station, a number in continuing sequence to each consecutive pattern row entering said first station;

(b) identifying, at said initial print application station, a first numbered pattern row immediately preceding said first reference mark;

(c) assigning, at said subsequent print application station, a number in continuing sequence to each consecutive pattern row entering said subsequent station;

(d) identifying, at said subsequent print application station, a second numbered pattern row immediately preceding said first reference mark;

(e) comparing, at said subsequent print application station, said sequential number assigned at said initial print application station with said sequential number assigned at said subsequent print application station;

(f) adjusting said pre-determined print gauge at said subsequent print application station to cause said sequential number assigned to the pattern row identified with the second reference mark at said subsequent print application station to equal the sequential number similarly assigned to the pattern row similarly identified with the second reference mark at said initial application station.

3. The method for registration control as recited in claim 2, said method further comprising:

(a) associating, at said initial print application station, a first associated pattern row applied to said substrate with said first reference mark;

(b) associating, at said subsequent print application station, a second associated pattern row applied to said substrate with said first reference mark, the sequential relationship between said reference mark and its associated pattern row at each of said print application stations being held constant;

(c) measuring a first distance at said initial print application station between said first reference mark and said first associated pattern row;

(d) measuring a second distance at a subsequent print application station between said first reference mark and said second associated pattern row;

(e) determining a distance difference between said first distance and said second distance;

(f) adjusting said print gauge at said subsequent print application station to reduce said difference.

4. The method of claim 3 wherein said first and second associated pattern rows are respectively equal to said first and second numbered pattern rows.

5. The method for registration control as recited in claim 2, said method further comprising:

(a) measuring a first distance at said initial print application station between a first reference mark and a pattern row adjacent to said first reference mark;

(b) measuring a second distance at a subsequent print application station between said first reference mark and said pattern row;

(c) determining a distance difference between said first distance and said second distance;

(d) adjusting the spacing of pattern rows to be printed at said subsequent station to reduce said difference.

6. A method for printing a series of pattern rows on a moving substrate in proper registration, for use with printers having at least two print stations, said method comprising the steps of:

(a) supplying a substrate in sequence to an initial print station and then to a subsequent print station;

(b) identifying, at said initial print station, a substrate interval of known length extending in the direction of substrate travel;

(c) printing, at said initial print station, a predetermined number of pattern rows at a fixed print gauge, which pattern rows collectively span the length of said substrate interval;

(d) measuring, prior to printing at a subsequent print station, a change in length of said substrate interval;

(e) adjusting said print gauge in accordance with the measured change in interval length, to allow said predetermined number of pattern rows to be printed at said subsequent print station to span collectively the changed length of said substrate interval;

(f) printing, at said subsequent print station, said predetermined number of pattern rows on said substrate interval at said adjusted print gauge.

7. The method of claim 6 wherein said pattern rows printed at said subsequent print station are uniformly spaced within the substrate interval.

8. A method for multi-station electronic patterning, with registration control, of a relatively moving substrate in row-by-row fashion, said method comprising the steps of:

(a) supplying a length of uncharged substrate to be patterned, said substrate carrying a barrier layer on a surface of said substrate, said substrate further carrying a plurality of reference marks fixed at intervals along said length of said substrate in the direction of substrate movement;

(b) applying, at an initial print application station and a pre-determined gauge, a number of pattern rows within a substrate interval defined by a first and a second of said plurality of reference marks, said second mark being preceded by said first mark, by
(1) providing a marking material which is substantially immiscible with said barrier layer,
(2) displacing, in row-by-row fashion, said barrier layer on said substrate surface within said substrate interval according to patterning information directed to said initial print application station;
(3) permitting said marking material to contact said substrate surface where said barrier layer has been displaced, thereby patterning said substrate;
(c) measuring the length of said substrate interval at said initial print application station;
(d) measuring the length of said substrate interval at a subsequent print application station;
(e) comparing the results of said measurements at said initial and said subsequent print stations, thereby determining any significant change in substrate dimension, as measured at said initial and subsequent print stations, between said first and said second reference marks along the direction of substrate movement;
(f) determining a new print gauge for use at said subsequent print application station to permit the number of pattern rows applied within said substrate interval at said subsequent print application station to equal the number of pattern rows applied within said substrate interval at said initial print application station;
(g) applying, at said subsequent print application station, at said new print gauge, said number of consecutive pattern rows within said substrate length as measured at said subsequent print station, by
(1) applying a new barrier layer to said substrate surface carrying print rows previously applied at said initial print application station;
(2) providing a marking material substantially immiscible with said new barrier layer;
(3) displacing, in row-by-row fashion, said new barrier layer according to patterning information directed to said subsequent print application station;
(4) permitting said marking material to contact said substrate surface where said new barrier layer has been displaced, thereby patterning said substrate in registration with patterning applied at said initial print station.

9. An apparatus for maintaining correct registration in a printing system having a plurality of print application stations for printing a pattern on a relatively moving substrate wherein the desired image is a composite made from the superposition of a plurality of constituent images, each constituent image being formed as a plurality of closely spaced pattern rows and wherein each constituent image is printed in row-by-row fashion at a respective print application station spaced along the path of the substrate, said apparatus comprising:
(a) an initial and a subsequent print application station;
(b) means for supplying a quantity of substrate to be printed, said substrate having a plurality of reference marks fixed at intervals along the substrate in the direction of substrate movement;
(c) means for applying, at said initial print application station and at a pre-determined print gauge, a number of consecutive pattern rows within a substrate length defined by a first and a second of said plurality of reference marks, said second mark being preceded by said first mark;
(d) means for measuring said substrate length at said initial print application station;
(e) means for measuring said substrate length at said subsequent print application station following said initial station;
(f) means for comparing the results of said substrate measurements at said initial and said subsequent print stations, thereby determining any change in substrate length, as measured at said initial and subsequent print stations, between said first and said second reference marks along the direction of substrate relative movement;
(g) means for adjusting said pre-determined print gauge for use at said subsequent print application station to permit the number of pattern rows applied between said first and said second marks at said subsequent print application station to equal the number of pattern rows applied between said first and said second reference marks at said initial print application station.

10. The apparatus for registration control as recited in claim 9, said apparatus further comprising:
(a) means for assigning, at said initial print application station, a number in continuing sequence to each consecutive pattern row entering said first station;
(b) means for identifying, at said initial print application station, a first numbered pattern row immediately preceding said first reference mark;
(c) means for assigning, at said subsequent print application station, a number in continuing sequence to each consecutive pattern row entering said subsequent station;
(d) means for identifying, at said subsequent print application station, a second numbered pattern row immediately preceding said first reference mark;
(e) means for comparing, at said subsequent print application station, said sequential number assigned at said initial print application station with said sequential number assigned at said subsequent print application station;
(f) means for adjusting said pre-determined print gauge at said subsequent print application station to cause said sequential number assigned to the pattern row identified with the second reference mark at said subsequent print application station to equal the sequential number similarly assigned to the pattern row similarly identified with the second reference mark at said initial application station.

11. The apparatus for registration control as recited in claim 10, said apparatus further comprising:
(a) means for associating, at said initial print application station, a first associated pattern row applied to said substrate with said first reference mark;
(b) means for associating, at said subsequent print application station, a second associated pattern row applied to said substrate with said first reference mark, the sequential relationship between said reference mark and its associated pattern row at each of said print application stations being held constant;
(c) means for measuring a first distance at said initial print application station between said first reference mark and said first associated pattern row;
(d) means for measuring a second distance at a subsequent print application station between said first reference mark and said second associated pattern row;

(e) means for determining a distance difference between said first distance and said second distance;

(f) means for adjusting said print gauge at said subsequent print application station to reduce said difference.

12. The apparatus for registration control as recited in claim 10, said apparatus further comprising:

(a) means for measuring a first distance at the initial print application station between a first reference mark and a pattern row adjacent to said first reference mark;

(b) means for measuring a second distance at a subsequent print application station between said first reference mark and said pattern row;

(c) means for determining a distance difference between said first distance and said second distance;

(d) means for adjusting the spacing of pattern rows to be printed at said subsequent station to reduce said difference.

13. An apparatus for printing a series of pattern rows on a moving substrate in proper registration, for use with printers having at least two print stations, said apparatus comprising:

(a) an initial and a subsequent print station;

(b) means for supplying a substrate to said initial print station and then to said subsequent print station;

(c) means for identifying, at said initial print station, a substrate interval of known length extending in the direction of substrate travel;

(d) means for printing, at said initial print station, a predetermined number of pattern rows at a fixed print gauge, which pattern rows collectively span the length of said substrate interval;

(e) means for measuring, prior to printing at a subsequent print station, a change in length of said substrate interval;

(f) means for adjusting said print gauge in accordance with the measured change in interval length, to allow said predetermined number of pattern rows to be printed at said subsequent print station to span collectively the changed length of said substrate interval;

(g) means for printing, at said subsequent print station, said predetermined number of pattern rows on said substrate interval at said adjusted print gauge.

* * * * *

UNITED STATES PATENT AND TRADEMARK OFFICE
CERTIFICATE OF CORRECTION

PATENT NO. : 4,401,024
DATED : August 30, 1983
INVENTOR(S) : Zane Frentress

It is certified that error appears in the above-identified patent and that said Letters Patent is hereby corrected as shown below:

Column 5, line 44, "warp" should be "wrap";

Column 6, line 14, "baised" should be "biased";

Column 10, line 44, "10PTRAINX10" should be "1PTRAINX10";

Column 11, line 30, "1MARKDIST(3/4)" should be "1MARKDIST(2/3)";

Column 14, line 57, "no" should be "to";

Column 16, line 44, "Not" should be "Note";

Column 18, line 68, insert "print" between "pre-determined" and "gauge".

Signed and Sealed this

Tenth Day of April 1984

[SEAL]

Attest:

GERALD J. MOSSINGHOFF

Attesting Officer    Commissioner of Patents and Trademarks